June 11, 1974 G. W. FULLER 3,816,578
METHOD OF BLOW MOLDING LINERS
Filed April 11, 1972
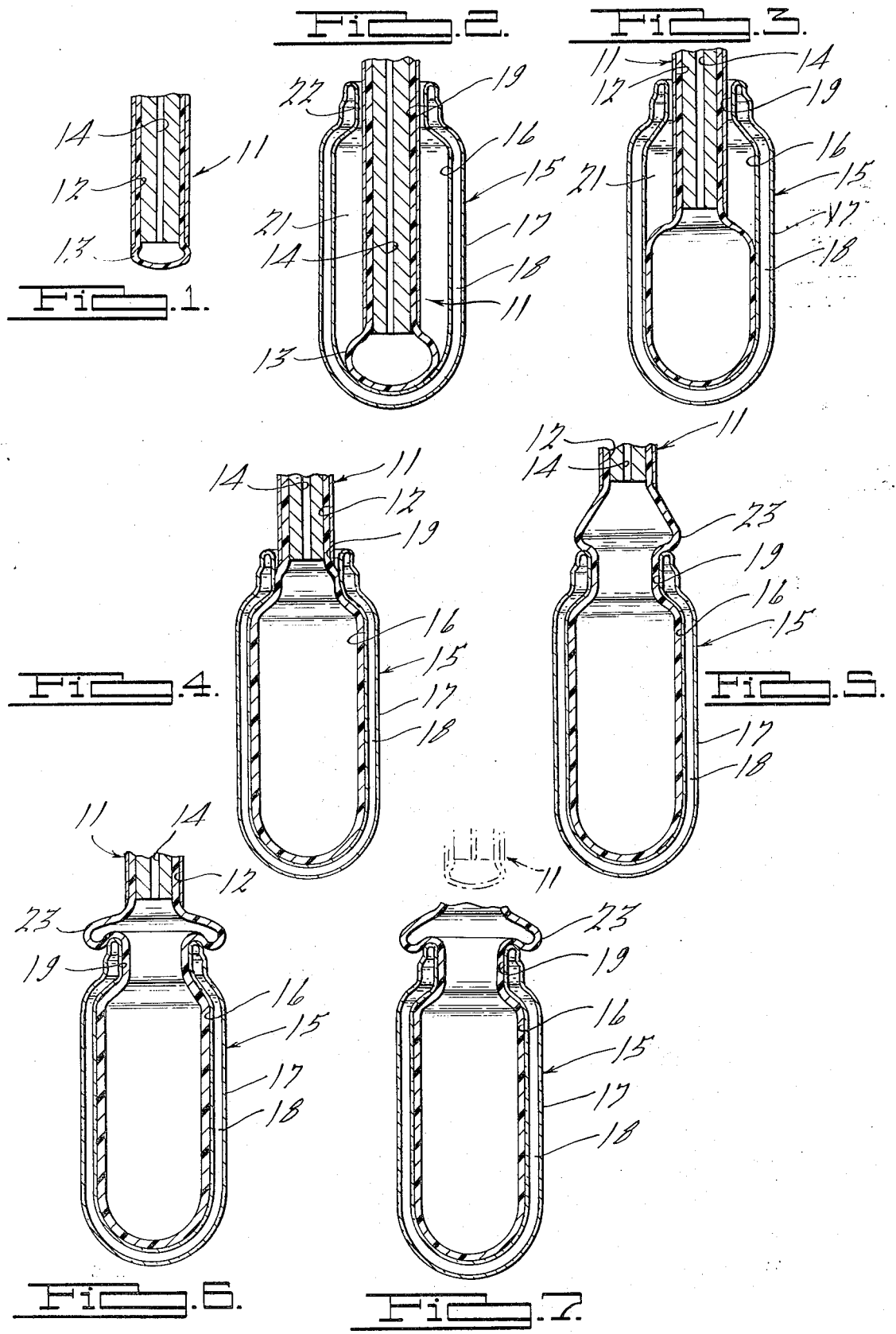

3,816,578
METHOD OF BLOW MOLDING LINERS
George W. Fuller, Hampton, Conn., assignor to King-Seely Thermos Co., Norwich, Conn.
Filed Apr. 11, 1972, Ser. No. 242,925
Int. Cl. B29c 17/07; B32b 1/10
U.S. Cl. 264—98      2 Claims

ABSTRACT OF THE DISCLOSURE

A method of blow molding a liner into a vacuum filler and particularly to a method for lining a filler having a constricted neck. The blow molding operation is started at the closed end of the filler and progresses toward the open neck. The extrusion or blowing head has a smaller diameter than that of the neck so that the air entrapped during the blowing process may be expelled through the resulting gap. The method also permits the liner to be formed around the outer periphery of the neck.

BACKGROUND OF THE INVENTION

This invention relates to a method of blow molding a liner and more particularly to an improved method for blow molding liners into vacuum fillers.

Recently, it has been proposed to employ plastic liners for the interior surfaces of various containers such as vacuum bottles. The liners may be formed in a variety of manners, but a particular difficulty is experienced in forming a liner for a vessel that has a constricted neck. With such an arrangement, it is almost essential that the liner be formed in place. Blow molding is a suitable method for so lining a constricted neck filler. However, as the liner is blown into engagement with the inner surface of the vessel, air pockets will be formed. Unless the entrapped air is removed, the liner will not completely cover the inner surface of the vessel and volume will be lost.

It is, therefore, a principal object of this invention to provide an improved method for blow molding a liner into a container.

It is another object of the invention to provide a method for blow molding liners into constricted neck vessels.

It is a further object of the invention to provide an improved method for lining vacuum fillers.

In addition to lining the interior surface of a vessel, it is often times desirable to form a layer of liner material around the neck or mouth of the vessel. It is, therefore, a further object of this invention to provide a method by which a blow molded liner may be applied to the outer surface of the neck of the lined vessel.

BRIEF SUMMARY OF THE INVENTION

This invention is adapted to be embodied in a method of blow molding a liner into a container having a constricted neck. The method comprises the steps of inserting an extruding and blowing head into the container through its open neck and into proximity to the closed end of the container. The outer diameter of the head is less than the diameter of the neck to provide an air gap therebetween through which entrapped air may escape. A parison is formed at the end of the blowing head and this parison is blown into engagement with the inner surface of the container. The extrusion head is gradually moved toward the open neck to progressively form a liner within the container from its closed end toward its open end while permitting entrapped air between the container and the formed liner to be exhausted through the air gap at the neck.

BRIEF DESCRIPTION OF THE DRAWINGS

FIG. 1 is a cross-sectional view taken through an extruding and blowing head embodying the invention.

FIGS. 2–7 are longitudinal cross-sectional views taken through a vacuum filler being lined by a blow molding process embodying the invention and showing the sequential steps of the blow molding process.

DETAILED DESCRIPTION OF THE PREFERRED EMBODIMENT

The reference numeral 11 indicates generally a combined extruding and blowing head adapted to be used in conjunction with performing the method embodying this invention. The head 11 may be of any known type and includes an annular extrusion cavity 12 through which a parison of lining material, indicated generally by the reference numeral 13, is extruded. Extending co-axially through the center of the extrusion cavity 12 is a blow cavity 14 that is adapted to receive air or another suitable gas at an elevated pressure.

A vacuum filler to be lined is identified generally by the reference numeral 15. The vacuum filler is comprised of inner and outer walls 16 and 17 that are separated by an evacuated space 18. The walls 16 and 17 are joined at the mouth of the vacuum filler 15 and a constricted neck 19 is formed in this area. The opposite end of the filler 15 is closed resulting in the formation of a cavity 21, to be lined.

To perform the method, the blowing and extruding head 11 is inserted through the neck 19 into proximity with the closed end wall of the cavity 21 (FIG. 2). The parison 13 will have been formed prior to this time and will be juxtaposed to the lower end wall. It should be noted that the outer diameter of the head 11 is less than the diameter of the neck 19 so as to result in the formation of an annular air gap 22 therebetween. The blowing operation is started by introducing air or another suitable gas or liquid at an elevated pressure through the blow hole 14. The parison 13 then expands in size and is forced against the inner wall 16. The blowing head 11 is drawn upwardly toward the neck 19 at a suitable and preferably uniform rate of speed during continuation of the extrusion and blowing of the liner material 13.

As the liner material 13 is blown into engagement with the inner wall 16, the air that formerly filled this space will be evacuated. FIG. 3 illustrates the blowing head 11 after it has moved approximately half of the length of the filler 15. It will be noted that the entrapped air can freely pass through the gap 22 between the blowing head 11 and the restricted neck 19.

The blowing operation continues until the head 11 is adjacent the neck 19 (FIG. 4). At this time, it may be desirable to reduce the blowing pressure. The liner material 13 is however continuously extruded and blown into engagement with the inner surface of the filler 15.

If it is desired only to coat the inner surface of the filler 15, the blowing operation may be discontinued at position shown in FIG. 4. It has been found, however, that this method may be used to form a protective coating of the liner material 13 around the upper end of the neck 19.

The blowing operation in conjunction with this method is, therefore, continued while the blowing head 11 is moved further away from the neck 19 (FIG. 5). At this time, it may be desirable to increase the blowing pressure. Since the liner material 13 is no longer supported by the inner wall 16, a billow 23 will be formed. The billow 23 will extend across a portion of the upper end of the neck 19. While the liner material of the billow 23 is still relatively flexible, the direction of movement of the blowing head 11 is reversed (FIG. 6). This reversal and movement causes the billow 23 to be deflected around the neck 19 and into engagement with the outer wall 17. Once suitable coating of the outer wall 17 has been accomplished, the liner material 13 is cut off and a new parison formed (FIG. 7).

In connection with the method, the details of the blowing head 11 and the extruding, blowing and feed apparatus has not been described in detail. This portion of the mechanism forms no part of this invention and any suitable apparatus known in this art may be employed to perform the disclosed method.

It is to be understood that the foregoing description is that of a preferred embodiment of the invention. Various changes and modifications may be made without departing from the spirit and scope of the invention as defined by the appended claims.

What is claimed is:

1. The method of blow molding a liner into a container having an opening at one end thereof surrounded by a side wall, said method comprising the steps of inserting an extruding and blowing head into the container through the opening and into proximity to the enclosed end thereof, the outer diameter of the extruding head being of a smaller size than the opening of the container so that entrapped air may escape through the resulting air gap during blowing, extruding a liner material from the head, blowing through the head into the extruded liner material to force the liner material into engagement with the inner surface of the container, gradually withdrawing the extrusion head toward the opening of the container while continuing the extruding and blowing to progressively form a liner within the container from its closed end toward its open end while permitting entrapped air between the container and formed liner to be exhausted through the air gap at the opening, continuing the extruding and blowing operation after the blowing head is withdrawn from the container opening to form a billow of liner material that engages at least in part the upper edge of the container around the opening, and reversing the direction of movement of the blowing head after the billow is formed for forcing the billow into engagement with an outer surface portion of the side wall of the container adjacent the opening.

2. A method of blow molding as set forth in claim 1 wherein the container comprises a vacuum filler consisting of an inner wall and an outer wall with an evacuated space therebetween.

References Cited
UNITED STATES PATENTS 3,169,086   2/1965   Meissner _____ 264—97 X JAN H. SILBAUGH, Primary Examiner U.S. Cl. X.R.

156—244, 287; 264—269